(12) United States Patent
Abu Ghdaib et al.

(10) Patent No.: US 11,550,284 B2
(45) Date of Patent: Jan. 10, 2023

(54) DYNAMIC REMOTE TERMINAL UNIT (RTU) CONFIGURATOR ASSIGNMENT SERVER ENABLED WASTEWATER EVAPORATION POND MANAGEMENT SYSTEM

(71) Applicant: Saudi Arabian Oil Company, Dhahran (SA)

(72) Inventors: Muhanned Abu Ghdaib, Toronto (CA); Fouad Alkhabbaz, Qatif (SA); Soloman M. Almadi, Dhahran (SA); Hassan S. Al-Yousef, Qatif (SA); Zakarya A. Abu Al Saud, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/148,862

(22) Filed: Jan. 14, 2021

(65) Prior Publication Data
US 2021/0132562 A1    May 6, 2021

Related U.S. Application Data

(63) Continuation-in-part of application No. 16/266,382, filed on Feb. 4, 2019, now Pat. No. 10,897,398.

(51) Int. Cl.
*H04L 12/28*    (2006.01)
*G05B 19/042*    (2006.01)

(52) U.S. Cl.
CPC .. *G05B 19/042* (2013.01); *G05B 2219/24215* (2013.01); *G05B 2219/2605* (2013.01)

(58) Field of Classification Search
CPC ........ G05B 19/042; G05B 2219/24215; G05B 2219/2605; H04L 41/0213; H04L 41/16;
(Continued)

(56) References Cited

U.S. PATENT DOCUMENTS 7,589,481 B2    9/2009  Sonoda et al.
10,326,796 B1 *  6/2019  Varadarajan ........ H04L 63/1425
(Continued)

FOREIGN PATENT DOCUMENTS

CN    110066066    7/2019
ES    2551802    11/2015

OTHER PUBLICATIONS

PCT International Search Report and Written Opinion in International Appln. No. PCT/US2022/012338, dated Apr. 11, 2022, 18 pages.

*Primary Examiner* — Chuong T Ho
(74) *Attorney, Agent, or Firm* — Fish & Richardson P.C.

(57) ABSTRACT

Systems and methods include a computer-implemented method for displaying future trends of evaporation pond wastewater quantity and quality. A distributed float network is managed using a wastewater evaporation pond management (WEPM) system with an embedded supervisory control and data acquisition (SCADA) system. The WEPM collects data, including sensory information, from evaporation ponds. A configuration data upload for remote terminal units (RTUs) managed by the WEPM is automated using the WEPM system and the embedded SCADA system. Evaporation pond wastewater quantity and quality and adherence to environmental standards and regulations are monitored using the WEPM system. Environmental compliance data is collected from the distributed float network. The environmental compliance data collected from the distributed float network managed by the WEPM system is analyzed. A dashboard is provided displaying future trends of the evaporation ponds wastewater quantity and quality.

17 Claims, 9 Drawing Sheets

(58) Field of Classification Search
CPC ... H04L 43/50; H04L 63/123; H04L 63/0876; H04L 41/147; H04L 41/5009; H04L 43/12; H04L 41/0886; H04L 67/025; H04L 67/125; H04L 67/303; H04L 41/0806; H04W 12/06; H04W 12/71; H04W 4/38
USPC ........................................ 370/252, 253, 254
See application file for complete search history.

(56) References Cited

U.S. PATENT DOCUMENTS

| | | | |
|---|---|---|---|
| 10,972,503 B1* | 4/2021 | Mohan | H04L 63/14 |
| 2004/0006513 A1* | 1/2004 | Wolfe | G05B 21/02 |
| | | | 705/22 |
| 2006/0196836 A1 | 9/2006 | Arakel et al. | |
| 2010/0002879 A1* | 1/2010 | Risley | H04L 63/0428 |
| | | | 380/255 |
| 2010/0050017 A1* | 2/2010 | Almadi | G01V 11/002 |
| | | | 713/400 |
| 2012/0210158 A1* | 8/2012 | Akiyama | G06F 11/07 |
| | | | 714/2 |
| 2016/0127953 A1* | 5/2016 | McMeekin | H04W 52/0206 |
| | | | 455/513 |
| 2017/0214708 A1* | 7/2017 | Gukal | G06F 16/285 |
| 2017/0223046 A1* | 8/2017 | Singh | H04L 51/12 |
| 2017/0272944 A1* | 9/2017 | Link, II | H04L 9/0841 |
| 2017/0272945 A1* | 9/2017 | Link, II | H04W 12/041 |
| 2017/0310706 A1* | 10/2017 | Wu | H04L 63/1491 |
| 2017/0349455 A1* | 12/2017 | Katz | E21B 43/20 |
| 2017/0353491 A1* | 12/2017 | Gukal | H04L 43/50 |
| 2018/0095155 A1* | 4/2018 | Soni | G01S 19/015 |
| 2018/0139104 A1* | 5/2018 | Seddigh | H04L 41/0213 |
| 2018/0198821 A1* | 7/2018 | Gopalakrishna | H04L 63/145 |
| 2018/0274334 A1* | 9/2018 | Fuchs | C02F 1/008 |
| 2019/0116100 A1* | 4/2019 | Porag | H04L 41/06 |
| 2020/0239329 A1 | 7/2020 | Patey | |
| 2020/0240248 A1* | 7/2020 | Abdeldaim | F04C 2/1071 |
| 2020/0252288 A1 | 8/2020 | Al-Yousef et al. | |

\* cited by examiner

DYNAMIC REMOTE TERMINAL UNIT (RTU) CONFIGURATOR ASSIGNMENT SERVER ENABLED WASTEWATER EVAPORATION POND MANAGEMENT SYSTEM

CROSS-REFERENCE TO RELATED APPLICATIONS

This application is a continuation-in-part of, and claims the benefit of priority to, U.S. patent application Ser. No. 16/266,382, filed on Feb. 4, 2019, the contents of which are hereby incorporated by reference.

BACKGROUND

Technical Field

The present disclosure relates to providing embedded Supervisory Control and Data Acquisition (SCADA) Remote Terminal Units (RTU) automated configuration assignments at the RTU level.

Background

Generally, a SCADA includes automation software designed specifically to perform data acquisition requirements for an individual plant. The software can control commands and data transfer between master stations, for example, one or more servers and software responsible for communicating with the field equipment, human machine interface (HMI) workstations in control rooms, and field devices that are connected to RTUs, including pressure transmitters, flow meters, and temperature sensors.

A distributed control system (DCS) is designed to perform regulatory control algorithm for controlled processes, for example, to keep processes within a setpoint within a specific area of the plant or risk area. Unlike a DCS, supervisory controls can perform event-based monitoring algorithms (for example, data-gathering) over a large geographical area. SCADA systems can include a telemetry-based process control command initiated from a master central station either manually by operator or automatically by an application. This can initiate an action or change an analog set point in remotely-located control stations (including RTUs) over a bidirectional communications link using specific communication protocols. Such commands can depend on having quality process-related alarm/event data. Further, the commands can follow timely bidirectional confirmation and acknowledgment executing sequences between the master and the station, known as check before operate (CBO).

Master stations can include multiple servers, distributed software applications, and disaster recovery sites. A master station can include all network switch and connectivity devices required to communicate with RTUs and remote sites using bidirectional information transfer between master and remote terminals (for example, within a communication channel). As part of SCADA operation, commands can be sent by operators or by applications in binary or analog (set-point) from an HMI station to field instruments connected to a particular RTU to provide a status reading or to perform a certain action remotely. The command originating from the HMI station can be delivered to its target as quickly as possible, typically in the order of seconds or sub-seconds. If a command cannot be delivered or acted upon, the SCADA system can report this to the operator.

Master stations, HMIs, and RTUs can utilize a communication medium that facilitates the signaling between these terminals, for example, using a path between master stations and an HMI, RTU, programmable logic controller (PLC), or a subsystem. This can be part of an overall communications subsystem that performs the transmitting and receiving of digital information for the entire SCADA system. The communications subsystem can utilize media such as fiber optics, copper cabling, wireless and very small aperture terminal (VSAT) communications.

SUMMARY

The present disclosure describes techniques that can be used for providing automatic configuration assignment capabilities for remote terminal units (RTUs) (or programmable logic controllers (PLCs)). Automatic configuration assignment capabilities can be provided in a supervisory control and data acquisition system (SCADA) network without the direct intervention of a control system engineer (CSE). The automatic configuration pertains to the capability of configuring a raw RTU "from scratch" by: 1) facilitating an initial node configuration (including assigning the RTU preliminary communication address parameters) using a low-level communication method and apparatus; 2) receiving augmented authentication controls from existing network access control (NAC) or site occupancy sensors (for example, radio frequency identification (RFID) and motion sensors or both); and 3) uploading the full configuration of the field device (RTU or PLC), facilitating a high-level communication method and apparatus.

In some implementations, a computer-implemented method includes the following. A distributed float network is managed using a wastewater evaporation pond management (WEPM) system with an embedded SCADA system. The WEPM collects data, including sensory information, from evaporation ponds. A configuration data upload for RTUs managed by the WEPM is automated using the WEPM system and the embedded SCADA system. Evaporation pond wastewater quantity and quality and adherence to environmental standards and regulations are monitored using the WEPM system. Environmental compliance data is collected from the distributed float network. The environmental compliance data collected from the distributed float network managed by the WEPM system is analyzed. A dashboard is provided displaying future trends of the evaporation ponds wastewater quantity and quality.

The previously described implementation and other implementations are implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. The techniques can simplify and speed deployment of grass root the mode RTUs in a SCADA network, especially in physically unprotected locations that are distributed geographically. The techniques can provide a mechanism to re-test (or evaluate on spot) several working models for the RTU in remote site without having to bring the RTU in from the field. The techniques can be used to build an instant laboratory snapshot (for example, a temporary staging as part of Factory Acceptance Test (FAT)/Site Acceptance Test (SAT) testing procedures) of the entire SCADA. The technique provides data quality and integrity based on preset thresholds and validation with the ability to remotely configure and adjust.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description is related to providing a dynamically configurable Wastewater Evaporation Pond Management (WEPM) System. The WEPM system includes an embedded supervisory control and data acquisition (SCADA) system and enables automated configuration assignments of remote terminal units (RTUs) at the RTU level. The automated configuration assignments can be part of automating a configuration data upload, as part of SCADA systems for upstream oil and gas applications, pipeline applications, power and utility applications, specifically applications that are unprotected by adequate physical security controls. In addition, a Dynamic RTU Configurator Assignment Server (DRCAS) capability can be extended to a network connected float apparatus that monitors and examines evaporation ponds wastewater quantity and quality and adherence to environmental standards and regulations. As part of the present disclosure, the float apparatus can be configured dynamically by DRCAS as part of the WEPM system. The WEPM system can collect environmental compliance data from a distributed float network, performing data analytics and displaying future trends on corporate dashboards.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1:
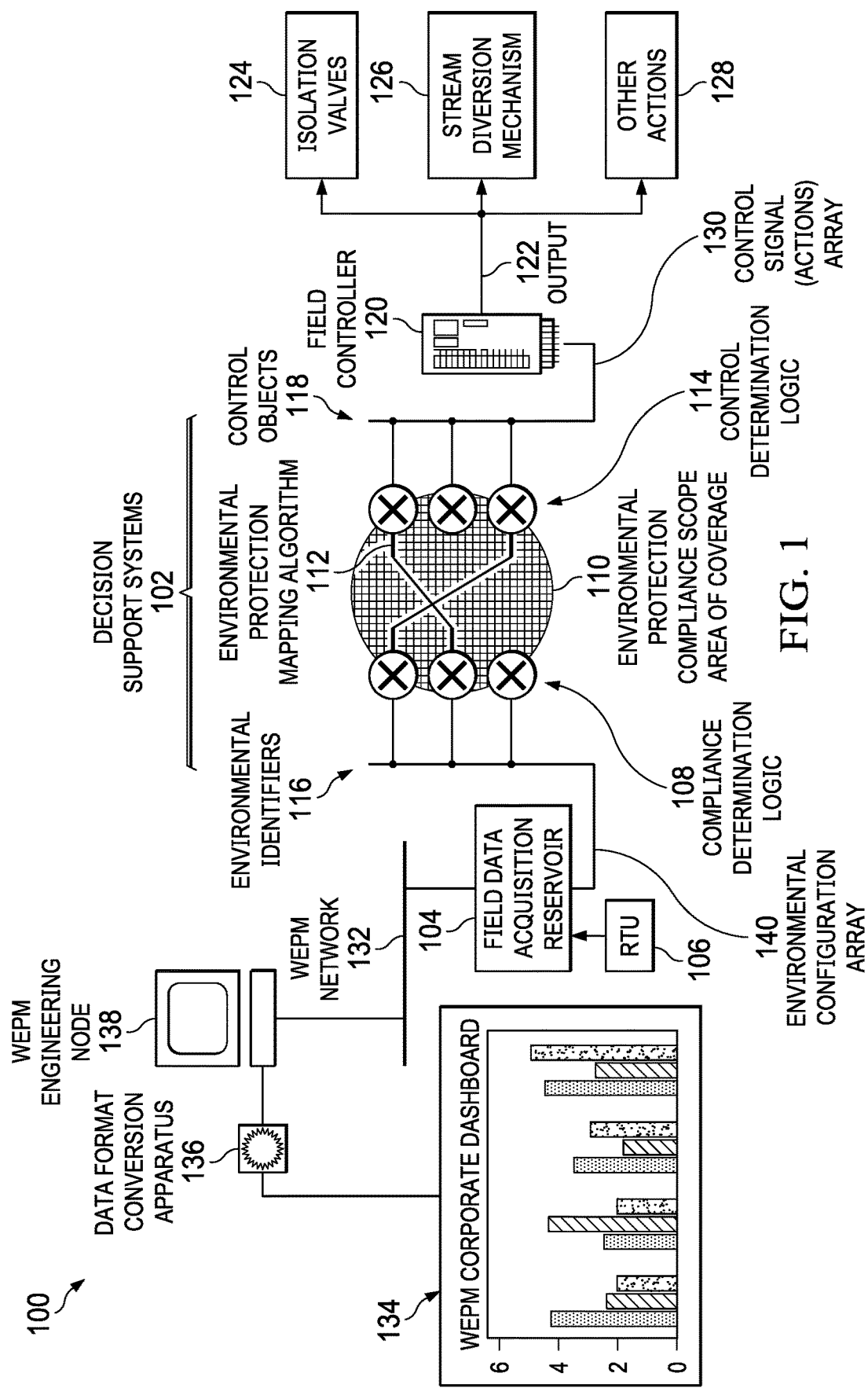
FIG. 1 is a functional block diagram of a network security architecture providing remote terminal units (RTU) data replication services, according to some implementations of the present disclosure.

FIG. 1 is a functional block diagram of a network security architecture 100 providing RTU data replication services, according to some implementations of the present disclosure. The network security architecture 100 includes decision support services 102 that can be used during configuration of a field data acquisition reservoir 104, for example, an RTU 106. The decision support services 102 use logic including compliance determination logic 108, environmental protection compliance scope of coverage 110, an environmental protection mapping algorithm 112, and control determination logic 114. The decision support services 102 can produce environmental (env.) identifiers (IDs) 116 and control objects 118.

The control objects 118 can be used by a field controller 120 that produces outputs 122 including outputs for isolation valves 124, a stream diversion mechanism 126, and other actions 128. The field controller 120 receives a control signal (actions) array 130 from the decision support services 102.

A WEPM network 132 can provide a WEPM corporate dashboard 134 to users, for example, provided on a data format conversion apparatus 136 receiving input from a WEPM engineering node 138. The field data acquisition reservoir 104 can receive an environmental configuration array 140 from the decision support services 102.

Figure 2:
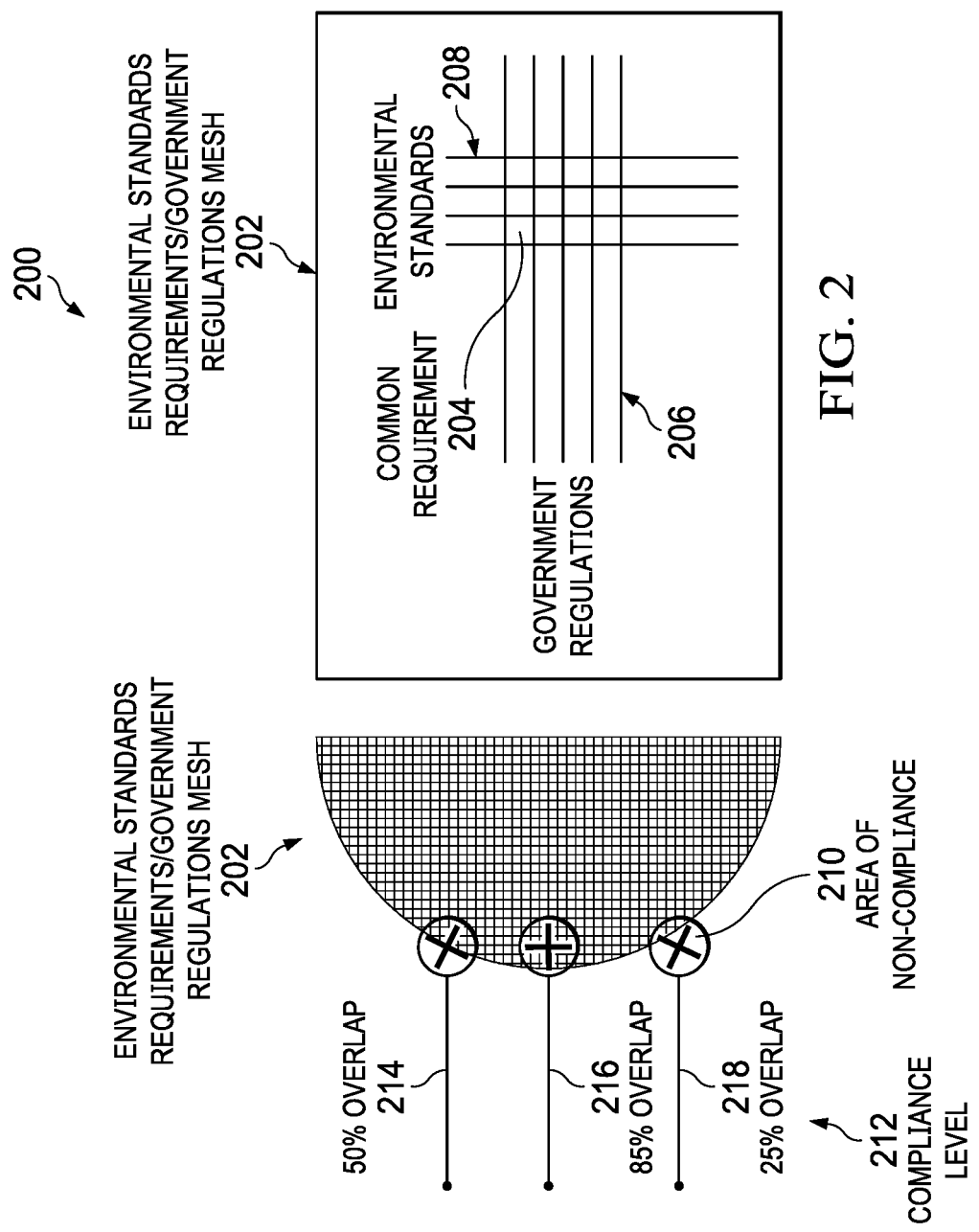
FIG. 2 is a functional block diagram of an artificial intelligence prediction of compliance level system, according to some implementations of the present disclosure.

FIG. 2 is a functional block diagram of an artificial intelligence prediction of compliance level system 200, according to some implementations of the present disclosure. The system 200 includes an environmental standards requirements and government regulations mesh 202. Common requirements 204 are indicated at intersections in the mesh of government regulations 206 and environmental standards 208. An area of non-compliance 210 includes a compliance level 212 (for example, a 50% overlap 214, an 85% overlap 216, and a 25% overlap 218).

Figure 3:
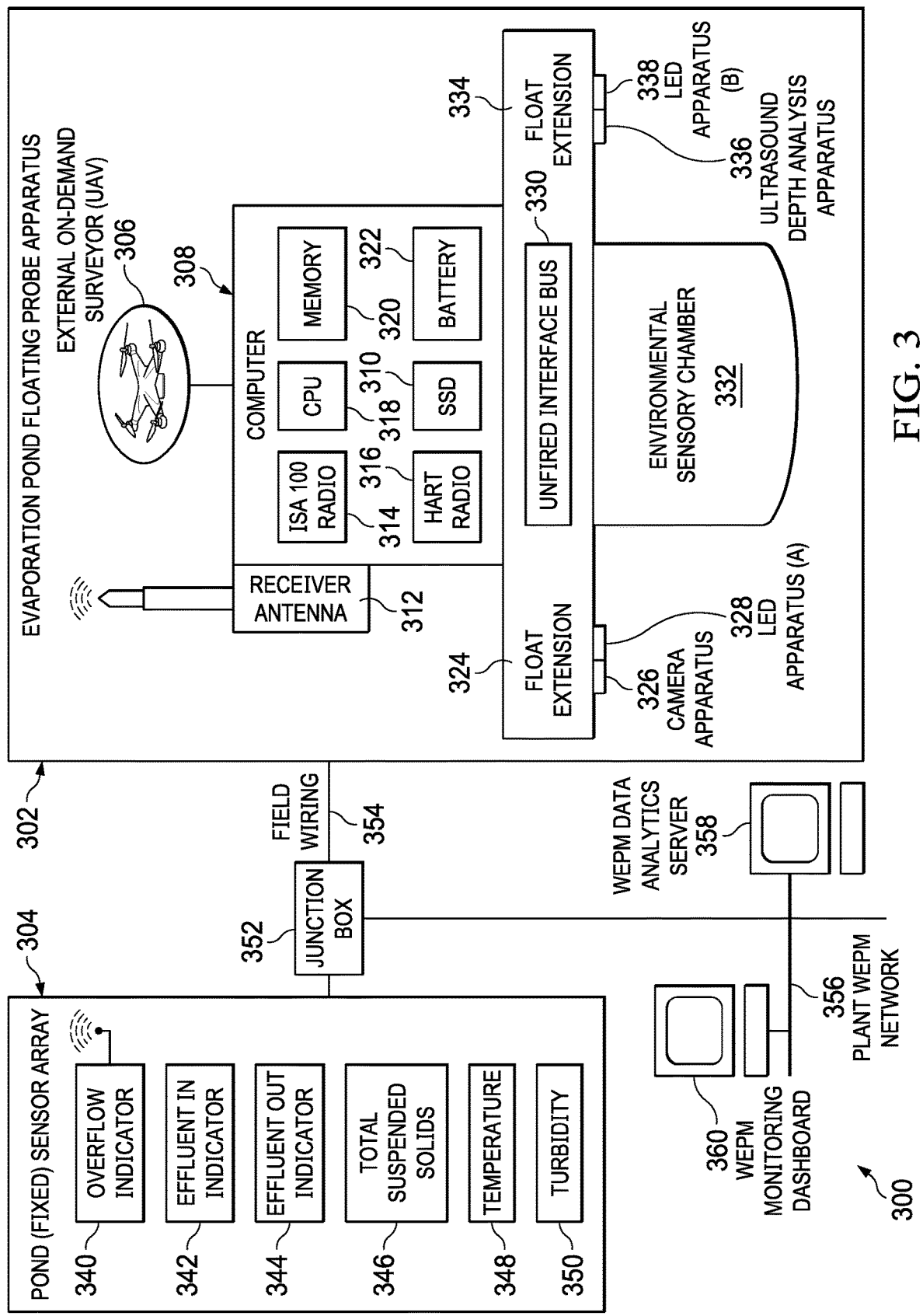
FIG. 3 is a functional block diagram of a wastewater evaporation pond floating apparatus and pond fixed sensory array components, according to some implementations of the present disclosure.

FIG. 3 is a functional block diagram of system 300 including a wastewater evaporation pond floating probe apparatus 302 and pond fixed sensory array components 304, according to some implementations of the present disclosure. The evaporation pond floating probe apparatus 302 includes an external on-demand 306 and a computer 308 (including a service set identifier (SSID) 310, a receiver antenna 312, an International Society of Automation (ISA)

100 radio 314, a highway addressable remote transducer (HART) radio 316, a central processing unit (CPU) 318, memory 320, and a battery 322). The computer 306 is connected to a float extension (including a camera apparatus 326 and a light emitting diode (LED) apparatus 328), unified internal bus 330 (connected to an environmental sensory chamber 332), and a float extension 334 (including an ultrasound depth analysis apparatus 336 and an LED apparatus 338).

The pond fixed sensory array components 304 include an overflow indicator 340, an effluent In indicator 342, an effluent Out indicator 344, a total suspended solids indicator 346, a temperature indicator 348, and a turbidity indicator 350. Pond fixed sensory array components can also include sludge accumulation patterns and pond structural analysis data. The evaporation pond floating probe apparatus 302 is connected to the pond fixed sensory array components 304 using a junction box 352 and field wiring 354. The junction box 352 is also connected to a plant WEPM network 356 that includes a WEPM data analytics server 358 and a WEPM monitoring dashboard 360.

Figure 4:
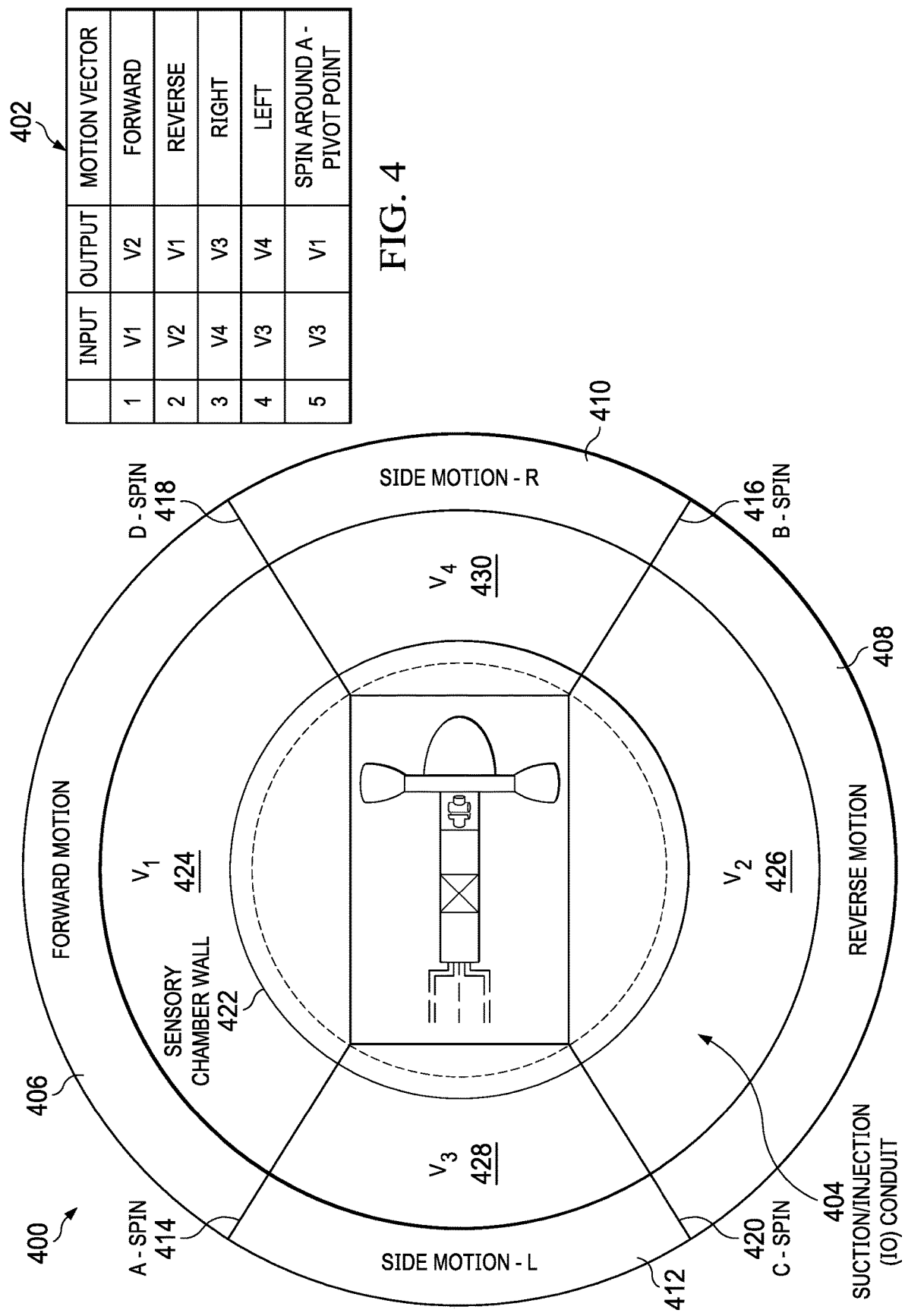
FIG. 4 is a functional block diagram depicting the propeller list of motion functions, according to some implementations of the present disclosure.

FIG. 4 is a functional block diagram depicting a propeller list of motion functions 400, according to some implementations of the present disclosure. An input-output motion vector table 402 and a suction/injection input/output (I/O) conduit 404 are configured to provide forward motion 406, reverse motion 408, right-side motion 410, and left-side motion 412. The motions can create A-spin 414, B-spin 416, C-spin 418, and D-spin 420. Motion vectors include vector $V_1$ 424, vector $V_2$ 426, vector $V_3$ 428, and vector $V_4$ 430, corresponding to vector information in the input-output motion vector table 402.

Figure 5:
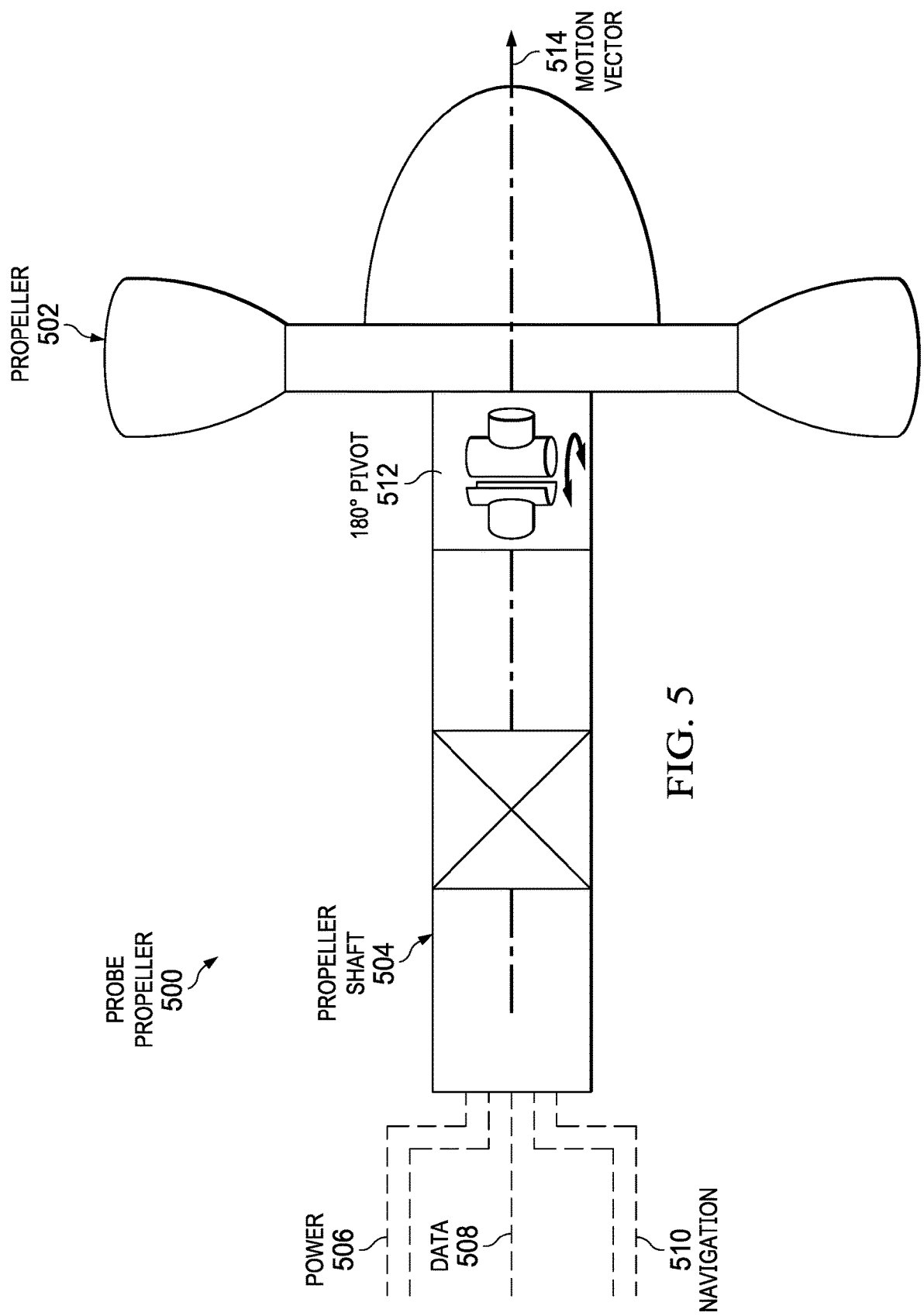
FIG. 5 is a functional block diagram of a probe propeller, according to some implementations of the present disclosure.

FIG. 5 is a functional block diagram of a probe propeller 500, according to some implementations of the present disclosure. Propeller 502 is attached to a propeller shaft 504 controlled by power 506, data 508, and navigation 510. A 180-degree pivot 512 facilitates differences in a motion vector 514.

Figure 6:
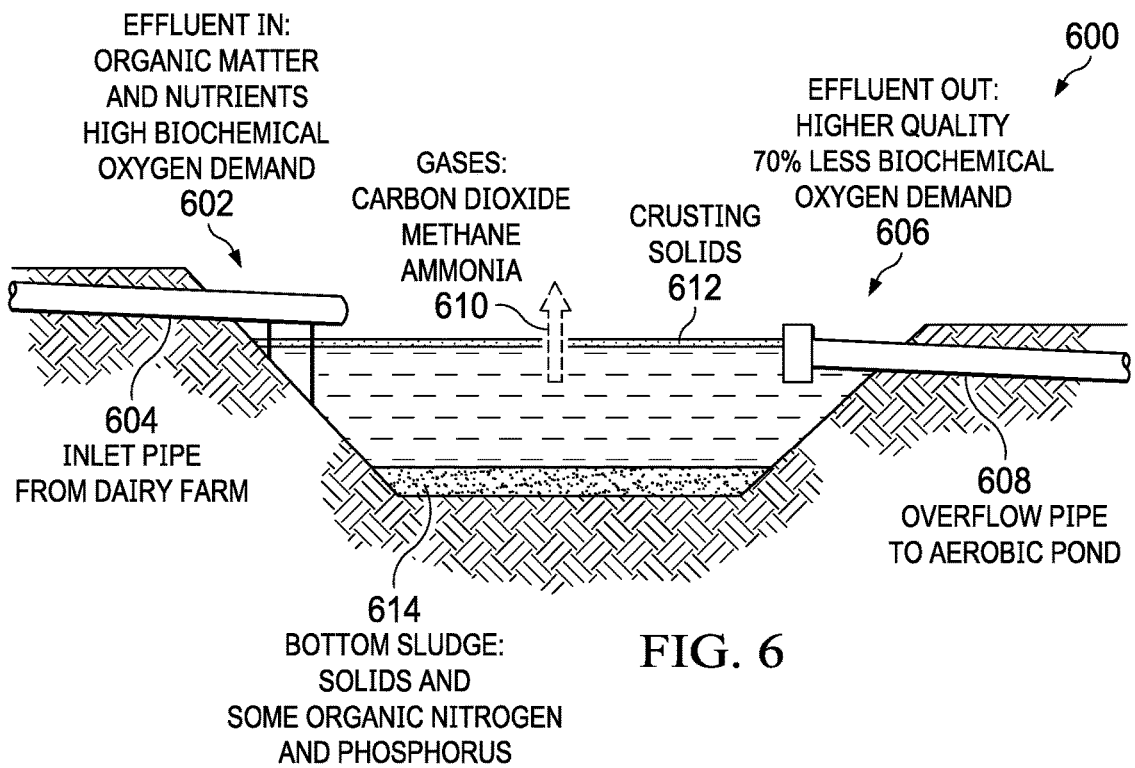
FIG. 6 is a functional block diagram of a typical wastewater evaporation pond, according to some implementations of the present disclosure.

FIG. 6 is a functional block diagram of a typical wastewater evaporation pond 600, according to some implementations of the present disclosure. An effluent In 602, for example, delivered by an inlet pipe 604 from an industrial facility such as gas plant or a refinery, or sanitary treatment plant, can include organic waste matter, with a high biochemical oxygen demand (BOD). An effluent Out 606, outputting to an overflow pipe 608 to an aerobic pond, for example, can include higher quality 70% less BOD. The pond 600 can include crusting solids 612 and can produce carbon dioxide, methane, and ammonia 610. Bottom sludge 614 at the bottom of the pond 600 can include some organic nitrogen (N) and phosphorus (P).

Figure 7:
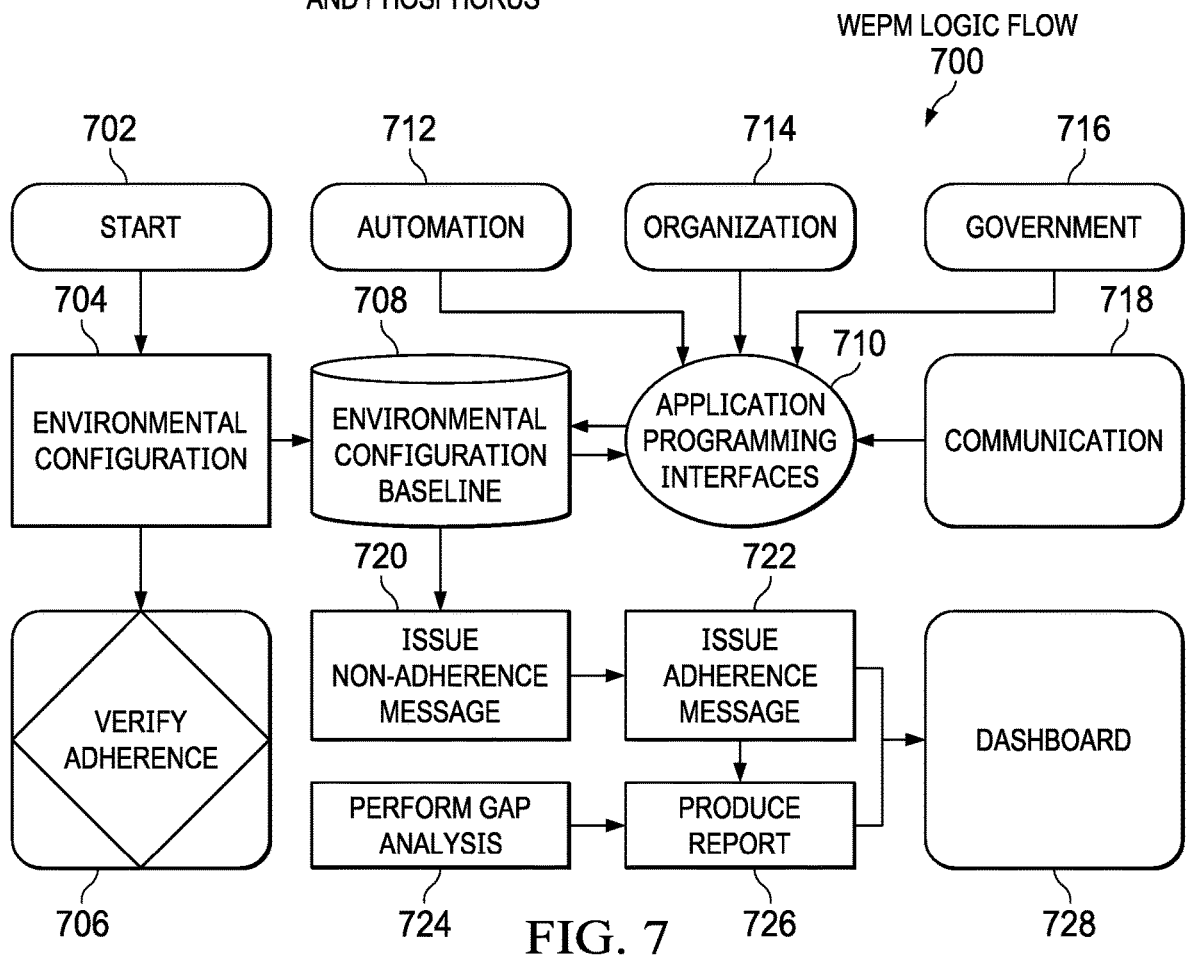
FIG. 7 is a functional block diagram depicting the logic flowchart for a Wastewater Evaporation Pond Management (WEPM), according to some implementations of the present disclosure.

FIG. 7 is a functional block diagram depicting the logic flowchart 700 for a WEPM, according to some implementations of the present disclosure. After starting 702, the workflow 700 includes environmental configuration 704 that is used to verify adherence 706 to environmental regulations. The environmental configuration 704 produces an environmental configuration baseline 708 that is accessible using application programming interfaces (APIs) 710, including APIs for automation 712, organization 714, Government 716, and communication 718. The environmental configuration baseline 708 can issue non-adherence messages 720 and adherence messages 722. Gap analysis 724 is performed, and results are used to produce reports 726, which can be displayed in a dashboard 728.

Figure 8:
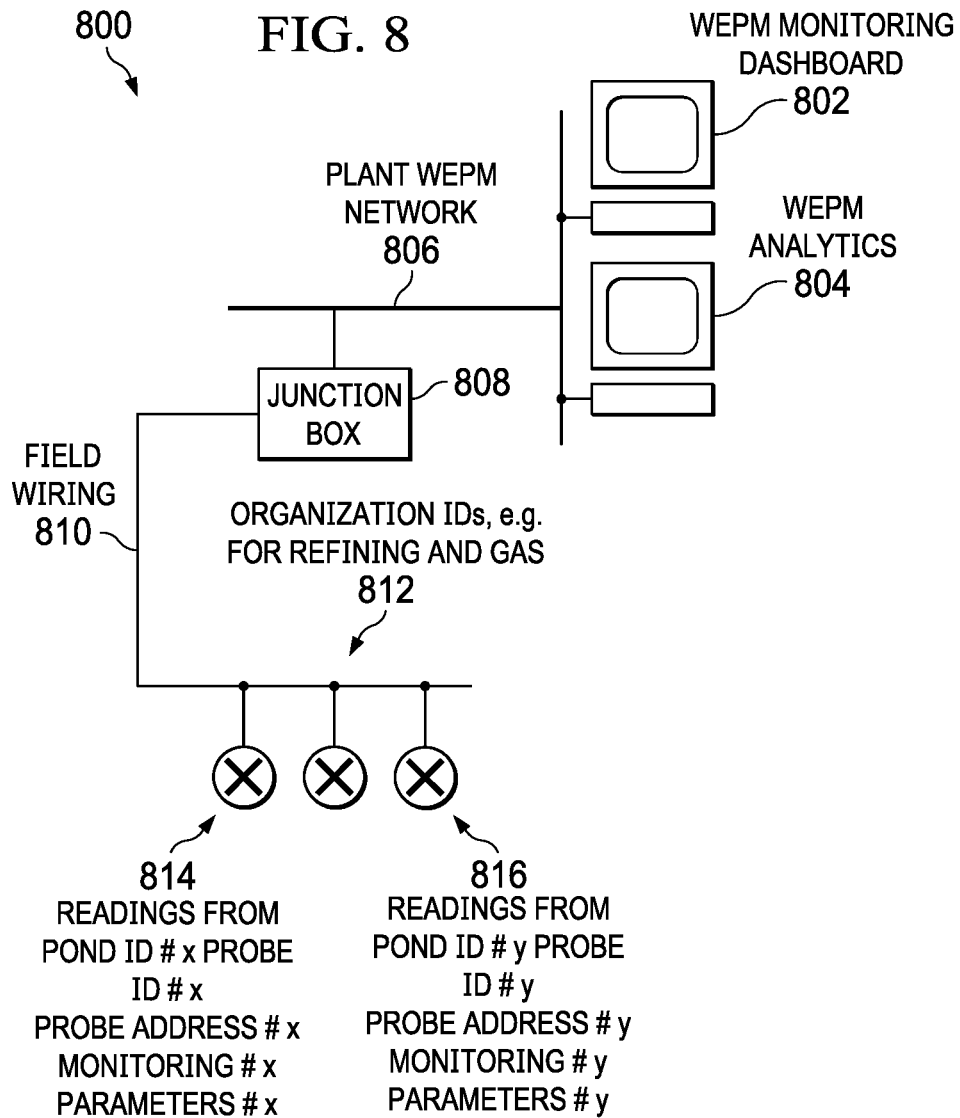
FIG. 8 is a functional block diagram depicting the plant WEPM network, according to some implementations of the present disclosure.

FIG. 8 is a functional block diagram depicting a plant WEPM network 800, according to some implementations of the present disclosure. A WEPM monitoring dashboard 802 and a WEPM Analytics display 804 are connected to plant WEPM network 806. The network includes a junction box 808 connected using field wiring 810 providing access to organization IDs 812 (for example, including refining and gas IDs). Organization IDs 812 can include, for example, an ID 814 (for readings from Pond X having pond ID # X, probe ID # X, probe address # X, monitoring # X, and parameter # X) and ID 816 (for readings from Pond Y having pond ID # Y, probe ID # Y, probe address # Y, monitoring # Y, and parameter # Y).

Using the network security architecture 100, a system and method can provide embedded SCADA RTU's automated configuration assignment at the RTU level, more particularly to a system and method for automating the configuration data upload, as part of Supervisory Control and Data Acquisition (SCADA) systems for upstream oil and gas applications, pipeline applications, power and utility applications specifically those unprotected by adequate physical security controls. In addition, extending the Dynamic RTU Configurator Assignment Server (DRCAS) capability to a network connected float apparatus that monitors and examines evaporation ponds wastewater quantity and quality and its adherence to environmental criteria, standards and regulations. The float apparatus will be configured dynamically by DRCAS as part of Wastewater Evaporation Pond Management (WEPM) system. The WEPM system collects environmental compliance data from a distributed float network, performs data analytics and displays future trends on corporate dashboards.

Typically, before an RTU (or programmable logic controllers (PLC)) is deployed into the field, it is normally brought in from the warehouse into the plant's Central Control Room (CCR) configuration lab where the CSE manually assigns the initial configuration parameters for the RTU including, for example, an RTU name, Internet protocol (IP) address. Next, the RTU is further configured with field instrument port and address assignments. Once fully configured, the RTU is then transported to the designated installation site where field instrumentation engineers can install, verify, and cable termination panels, connect the RTU to field devices, and power the RTU on for initial SCADA data acquisition testing.

In some occasions, the newly-installed RTU does not function properly within the pre-specified parameters as set forth by the engineering design document. This can be attributed to faults in instrumentation, for example, connectors, field devices such as sensors, transmitters, cable termination, or an RTU power supply. In such events, the field instrumentation engineers can apply the required fixes to bring the RTU back into normal operations. This can be done by inspecting the field wiring for errors, replacing a faulty instrument, or adjusting the power supply levels to the RTU.

In other occasions, however, the newly-installed RTU does not properly function within the pre-specified parameters as set forth by the SCADA engineering design document due a misconfiguration error that can only be fixed by applying a new, modified configuration file. Unless the process control engineer is on-site with the right equipment (including, for example, a laptop computer, configuration software, and configuration hardware including cables and connectors), the RTU will most likely be required to be brought back to the main facility's central control room (CCR) for a re-configuration. Considering a mass SCADA deployment project involving the installation of tens of RTUs in geographically-spread locations (for example, in desert or deep-sea locations), such prospect can be very time- and effort-consuming, causing project deployment delays and eventual production loss.

The present disclosure describes techniques that can be used to provide embedded dynamic configuration assignment capabilities for unprotected remote terminal unit (RTUs) that can be used to fully and securely configure a "raw" RTU remotely from the main facility without having to transport the CSE to the RTU location. The techniques can be included as part of a system and a method for SCADA network access from a remote RTU in a physically unprotected location. Further, the techniques can be defined by configuration data that is augmented with associated personnel identification and authentication information, for example, as part of SCADA networks. For example, the SCADA networks can support upstream oil and gas applications, pipeline applications, and power and utility applications, specifically in installations that are unprotected by adequate physical security controls.

In some implementations, a computer-implemented method can be used for remotely configuring a RTU after a request. An RTU configuration request is received by a DRCAS in a SCADA network. The RTU configuration request can be a request to configure an RTU residing in a location remote from the DRCAS. The RTU can be pre-configured with an embedded remote configuration assignment capability. As part of this method, an initial low-level communication channel with the RTU will need to be established by the DRCAS through an initial data communication relay (IDCR) apparatus that either can be fitted as part of the RTU or as a standalone device downstream of the RTU. The low-level communication channel uses a low-level communication protocol to convey initial configuration parameters such as the RTU request to obtain a configuration, RTU name, and RTU medium access control address (MAC). A SCADA communication protocol (SCP) address for the RTU is then assigned by the DRCAS through the IDCR after receiving augmented authentication controls from existing network access control (NAC) or site occupancy sensors (for example, radio frequency identification (RFID) and motion sensors, or both) to ensure authenticity of the RTU and validity of the configuration request. Once authenticated, the DRCAS can assign a high-level communication channel address with the RTU followed by a full configuration upload to the RTU memory bank.

In some implementations, a computer-implemented method includes a method for remotely configuring a RTU. An RTU configuration is uploaded from DRCAS through the low-level communication IDR apparatus and the DRCAS-supported high-level communication channel with peer-to-peer hash function security authentication and integrity check. As part of this method, the DRCAS and the "raw" RTU are pre-programmed to apply a hash function with multi-input parameters such as an RTU MAC address, the first three digits of the RTU name, the site appreciation index, and the badge number of the CSE. The hash function methodology can be enabled in the absence of NAC apparatus and field security control such as RFID and motion sensors or a combination of both.

A system for remote RTU automated configuration assignment processes is provided. The system includes a DRCAS system to facilitate the automated configuration process. Additionally, an automated configuration assignment processes is provided not only to facilitate the ease of interconnecting a grass-root RTU to the SCADA network, but also to interconnect an Industrial Internet of Things (IIoT) Wastewater Evaporation Pond Management (WEPM) System.

In summary, the present disclosure relates to providing embedded SCADA RTU's automated configuration assignment at the RTU level, more particularly to a system and method for automating the configuration data upload, as part of SCADA systems for upstream oil and gas applications, pipeline applications, power and utility applications specifically those unprotected by adequate physical security controls. In addition, the DRCAS capability can be extended to a network connected float apparatus that monitors and examines evaporation ponds wastewater quantity and quality and its adherence to environmental standards and regulations. As part of the present disclosure, the float apparatus can be configured dynamically by DRCAS as part of the WEPM system to obtain: 1) Floating probe specific configuration; such as probe ID, probe network address, and probe monitoring parameters; and 2) evaporation pond specific configuration information, such as pond ID, pond organization, facility pond type (for example, refinery, gas plant, or pipeline). The WEPM system can collect environmental compliance data from a distributed float network, perform data analytics, and display future trends on corporate dashboards.

Implementations can include providing an embedded WEPM float dynamic configuration, system interconnection, and environmental data acquisition. Implementations can be built on existing systems for automating RTU configurations, including DRCAS implementations in a SCADA system.

Implementations can include providing a system and a method for WEPM float apparatus dynamic configuration assignment, network connectivity, and environmental data acquisition capability at the field, in addition to providing automated WEPM processes to facilitate the ease of analyzing environmental compliance and maximizing energy utilization in hydrocarbon plant facilities.

The WEPM system for an industrial waste infrastructure can serve as a very crucial process due to the nature of these types of industrial applications requiring higher levels of accuracy brought by predictive control and performance improvements provided by wastewater treatment and management systems. WEPM uses IIoT technologies utilizing communications, networking solutions, online analyzers, artificial intelligence, dashboards, and data analytics tools. Use of the technologies in the WEPM system can: 1) minimize off-spec water in terms of high oil content to disposal wells; 2) provide control on levels of liquids discharged to the ponds and prevent overflows/overspills; 3) prevent and reduce system plant shutdowns as a result of mixing incompatible waters; 4) reduce environmental risk of sending the high $H_2S$ oily water to evaporation ponds; 5) improve energy efficiency and minimize crude loss to disposal wells; 6) reduce chemical dosage; and 7) avoid reactive system control and move to a proactive mode.

The present disclosure provides systems and methods to establish a WEPM system that is dynamically configured by DRCAS to facilitate the collection, correlation and reporting of environmental parameters using IIoT technologies as part of a floating probe apparatus.

In some implementations, the IIoT WEPM identifies all possible factors that can result in in any environmental noncompliance or performance/maintenance issues in the wastewater treatment plant, the evaporation pond, and its associated systems and equipment. The WEPM can provide a smart hub for data analysis and automatic decision making for predictive control using machine learning and artificial intelligence.

The present disclosure introduces data sets that can be provided in the smart hub including, but not limited to: 1) local and regional weather parameters such as precipitation and rainfall, sand storms, temperature, relative humidity, evaporation rates, wind speed, and direction; 2) historical data of the performance of the wastewater treatment plants discharging to the evaporation pond; 3) data collected from discharge streams to the evaporation pond other than the wastewater treatment plant effluent; 4) equipment and systems at a plant that contribute to the industrial wastewater discharge volumes and quality; 5) data from pumps, valves, and oil skimmers in the pond; 6) chemical dosing systems relevant to the discharge to the evaporation pond (for example, to monitor inventory, chemical types, dosing pumps, tank levels, and chemical concentrations), and evaporation pond levels (current and historic); 7) data from the monitoring wells surrounding the pond, including historic and current data from the emergency ponds that could support the operation in case the evaporation pond is temporarily out of service; 8) sludge volumes, either generated by the wastewater treatment plant or scraped from the bottom of the evaporation pond on a periodic basis; 9) monitoring of any floatables on the surface of the water in the pond that could slow down or prevent the evaporation process; and 10) monitoring against plantation growing in the pond, if any.

In some implementations, the smart WEPM can enable predictive control in addition to sending reports and alerts to operators and plant engineers. Additionally, the WEPM can provide equipment needed for the predictive control of the processes, such as automated valves, pumps, and any infrastructure to redirect or divert the flow of wastewater that do not meet predetermined specifications.

In some implementations, the floating apparatus enables: 1) monitoring and predictive control of treatment process; 2) monitoring and control of chemical dosing system; 3) effluent quality control and assurance; 4) advanced analytics and trending; and 5) reporting and alerting.

In some implementations, the WEPM can enable smart plants digital transformation by focusing on the utilization of IIoT technologies in communication, sensing, and data analytics for a smarter management of wastewater for a safer environment. Wastewater is produced from various industrial processes such as power generation, petroleum refineries, chemical production, food production, and domestic wastewater from households (including outflow from baths and washing machines). As required by the Governmental regulations and company standards, wastewater is treated before it is discharged to marine, evaporation ponds, public wastewater treatment plants (WWTP), and/or reused for irrigation. To treat wastewater, a number of techniques can be used involving physical, chemical, and biological processes which can include a number of treatment cycles. In such cases, treated wastewater undergoes continuous sampling, testing, and detailed analysis to ensure that it meets the regulations requirements.

Techniques of the present disclosure can be used to turn an existing manually operated wastewater evaporation pond into a comprehensive "smart" wastewater evaporation pond management system. The techniques can be used to measure performance and compliance parameters for a single pond in one facility or multiple ponds in a geographical area. The techniques can be used to automate control in a predictive approach in order to optimize variable system components and gates (for example, pumps, valves, air blowers, and mixers) and to achieve optimum performance while safely meeting environmental compliance limits and predicting/avoiding system failures due to sudden influent quality changes. Parameters that affect system performance can include, for example, environmental compliance parameters, providing a way to monitor and report compliance parameters for the selected deployment facility. Compliance parameters can be determined using one or more of government, company, and operating entities standards on the basis of a final point of discharge. Industry and government standards and regulations can provide a full list of compliance parameters according to the selected point of discharge. WEPM can provide alerts to facility stakeholders, including system owners and operators, in case of failures or exceedances. Alerts can be provided based on oil and other chemicals in water content to disposal wells. Additionally, WEPM can provide facilities with online monitoring systems capable of measuring oil and grease in real time at the point of discharge, for example, by company facilities that discharge directly to marine environments. Sanitary and industrial wastewater treatment facilities inspection processes can be used to ascertain a level of compliance with the governmental and company standards. For example, the term real-time can correspond to events that occur within a specified period of time, such as within a few minutes or seconds.

In some implementations, WEPM can be used to calculate corporate level environmental compliance by providing the capability to monitor and report compliance parameters for a selected deployment facility. Compliance parameters can be determined using the latest government and corporate standards, taking into consideration the following: a) industry environmental standards and site-specific discharge specifications; and b) regional and international standards and regulations providing a full list of compliance parameters according to the selected point of discharge.

In some implementations, the WEPM floating probe can be equipped with an environmental sensory chamber that contains sensors capable of detecting environmental parameters in normal and abnormal ranges.

In some implementations, the WEPM sensors can communicate with DRCAS RTUs using peer-to-peer communication. In this case, the DRCAS RTU can create peer-to-peer communications with all RTUs in its vicinity. Communication noise or interference may render communications with certain sensors as reliable in this case. In another communication technique, a more resilient way of communication can be established between all field sensors and the DRCAS RTU, such as in a mesh network. In this type of communication, the DRCAS RTU can receive more than one sensor's data relayed through another WEPM sensor. This can provide a multipath communication to WEPM sensors to overcome communication noise.

In some implementations, a pond that is being monitored can have multiple field sensors acquiring the same data for redundancy and accuracy. The data can be relayed from the multiple sensors to the field DRCAS RTU and then to an application server or data analytics server. The server can average the data values to increase accuracy. The server can also flag and time stamp any readings that are received for multiple sensors' data. The sensors may be far away from each, based on predefined values. Field sensor device errors can be used to instruct an operator to calibrate or replace the flagged field devices.

In some implementations, the WEPM sensor can contain a battery-powered elliptic curve cryptographic module based on trusted platform (TPM) architecture. The module can facilitate the exchange of shorter symmetric AES-128 keys between the sensor and the RTU for data transfer purposes. The module can also allow the secure boot of the sensor microcontroller and allow over-the-air (OTA) firmware updates of the sensor operating system (OS) as well as encryption of sensor data back to the RTU.

In some implementation, the WEPM can include virtual RTU controllers including a collection of RTUs having the capability to operate in a "virtual mode" where the static configuration (for example, using programs) and memory-resident portion of the RTU are transferable to a remote RTU upon excessive load or controller failure. I/O cards can be used for tunneling data to the remote RTU participating in the virtual controller architecture.

In some implementations, the WEPM can provide focusing on "end-of-pipe" monitoring and compliance. For example, with the use of advanced sensors and predictive tools, it is anticipated that monitoring and compliance can enter a "holistic arena." This can make it possible to predict the level of compliance upstream of an effluent discharge point and take mitigation steps to make sure that compliance is not impacted due to process variations in the treatment process.

In some implementations, the WEPM can introduce or adjust wastewater treatment components in order to maintain steady-state conditions, such as to achieve optimum system performance and to ensure that the system meets manufacturer operational specifications. Standard operating procedures (SOPs) can be incorporated in order to minimize, and ideally eliminate, the need for human interference. Human operators can be given the option to override the smart system's control as needed. Techniques can be used to identify key operational parameters specific to selected wastewater treatment facilities. The wastewater treatment facilities can require monitoring of the following parameters: 1) influent and effluent volumetric flowrates; 2) head works and solids removing equipment parameters; 3) inlet valves opening; 3) hydrogen sulfide ($H_2S$); 4) scraping frequency and duration; 5) pH (power of Hydrogen) acidity; 6) chemical injection; 7) biochemical oxygen demand (BOD); 8) performance of upstream equipment such as desalters, dehydrators, production traps, and low-pressure degassing tanks; 9) chemical oxygen demand (COD); 10) temperature; 11) Mixed liquor suspended solids (MLSS); 12) pressure; 13) settle-ability; 14) oil content; 15) contact time; 16) turbidity; 17) free and dissolved chlorine; 18) total suspended salts (TSS) and total dissolved solids (TDS); and 19) total Kjeldahl nitrogen (TKN).

In some implementations, and in addition to any other operational parameters required by SOPs, the WEPM can analyze the data, sends orders to variable gates, and adjust the process accordingly. The WEPM can account for a full cycle of the treatment process, including chemical dosing, chemical inventory and refill orders, solid waste manifesting (if applicable), system cleaning, storm event management, backwashing, membrane replacement (if applicable), bypassing and flow rerouting when needed, leak detection, periodic maintenance alerts for major system components, and system startup and shutdown. The system can use artificial intelligence, data bases, data analytics, and other techniques to meet monitoring and reporting compliance, minimize risk, achieve optimum performance, reduce system shutdown, and eventually avoid risk of environmental pollution liability on the company.

In some implementations, the WEPM can provide predictive analysis of data collected from sewer networks, including lift stations and grease traps upstream of the treatment process, and evaporation and emergency storage ponds downstream of the process. In wastewater reuse cases, for example, the WEPM can closely monitor and automatically control disinfection tanks and treated sewage effluent (TSE) storage tanks, and any component/equipment upstream or downstream of the treatment system that may impose environmental pollution risks such as uncontrolled overflows, leakages, and system failures that may lead to remediation liabilities.

In some implementations, the WEPM can help in ensuring the quality and adequacy of wastewater treatment as mandated by local regulations, in addition to providing capabilities to track leakages and prediction of uncontrolled dissemination of untreated wastewater or toxins to the environment. In addition, the WEPM can employ IIoT units that are installed in underground sewers and well-defined locations in the treatment process train, and send wastewater quality data to a central analytics engine. This can help to identify abnormalities, such as using algorithms to track events to their source and to generate automatic predictions and alerts. The result of the solution can yield significant improvements in the quality of effluent discharged to the environment. The techniques can include the use of smart analysis to reduce costs for water/wastewater utilities by having a complete 24/7, 360-degree overview of wastewater infrastructures.

In some implementations, the WEPM can facilitate the process of collecting, updating, and housekeeping of environmental informational assets related to an evaporation pond facility. The WEPM infrastructure equipment can collect environmental properties sensors-based information from a specialized floating probe that is mobilized on demand to a particular area of the pond for closer inspection and evaluation. The WEPM management process can include a methodology that ensures the probe is manufactured, supported, counted, and made available for its intended function. The WEPM infrastructure equipment can support a process or a system with three main components.

First, a WEPM dynamic collection engine can use a database which holds all information related to environmental controls pertaining to a single or multiple pond that are part of a single plant facility or a several facilities within a geographical area. This database can be kept dynamic and up-to-date. The asset database can be accomplished utilizing a combination of a floating probe apparatus in addition to centralized computerized tools, or combination of both. The primary purpose for this module is to build a dynamic database of WEPM components in the plant or an environmental database. The environmental database can reflect the complete environmental informational inventory of wastewater ponds and its status. The database source can be one or more of an enterprise environmental dashboard (EED) system, a WEPM system, and an environmental protection system. The database can track ponds' key process indicators (KPIs) used to manage a complete inventory of WEPM assets in a given operation. The techniques can utilize automated tools such as auto discovery that may be complemented with a manual survey, including answering related questions.

Second, a WEPM correlation engine can provide a correlation and an analysis engine to verify and validate the pond's management status through internal and external links. Internal links can include APIs used to access local databases and information warehousing. External links can be in the form of long-haul messages and queries all for the purpose of identifying and estimating the environmental readings validity or expiration status. Inventory management can govern infrastructure operability by identifying KPI such as a pond's reliability, technology, support, and compliance to environment and or regulation directives. The KPI tracking and updating can provide an early lead time on the state of the WEPM asset. Modules can utilize automated tools such as auto discovery tools implemented on the floating probe and may be complemented with a manual survey that includes answers to related questions. The modules can be used to calculate logical inputs from the instruments, other external or internal sources to update WEPM status, and to trigger the generation of reporting and alerting mechanisms.

Third, a WEPM asset report and alerting engine can provide an engine designed to proactively alert and notify the status of a pond's management, the pond's structural enhancement plans, and to approximate budgets required for expansion or modernization. The asset management reporting process can be based on information gathered by different systems or entities or an integrated system with feeds from a manufacturer, operating entities, and end users. Upon confirming asset management or near asset management, an economical model can be developed to address risks, funding, and an implementation plan. The module can provide reports and alerts generated by a plant, including reports based on different formats such as sending to a local and remote printer.

In some implementations, WEPM integrates intelligence to pond management process for WEPM consisting of all devices, systems, and subsystem with other integral systems and data network interfaces, and soft sensing to minimize the human interaction in implementing a broad pond management and assessment process. This can reflect a more accurate and less subjective results in quantifying an accuracy level. A workflow process can be programmed in a computer or machine-based device (for example, using a floating probe) to implement an on-line on demand process.

In some implementations, the system can also be supported by Simple Network Management Protocol (SNMP) capabilities. Special management information block (MIB) fields can be devised to reflect pond management status with alerts such as indicator lights, for example: 1) green if the SNMP trap value indicates that the asset is available for the next 5 years or more; 2) amber if the SNMP trap value indicates that the asset will run out in 1-5 years; and 3) red, if the SNMP trap value indicates that the asset will run out in one year or less. MIB information can be automatically gathered by any standard network management system (NMS), eliminating the need to have a separate monitoring and alerting system.

In some implementations, WEPM systems can introduce a dynamic flexibility with the communication and high-speed network interfaces (C&HNI), resulting in a WEPM C&HNI module. The C&HNI module can include two segments: local sensing network (LSN) and a wide area sensing network (WASN). In the LSN, WEPM sensing devices can be enabled to exchange data to the WEPM database with interfaces that include a media communication converter based on either fiber, copper, or wireless. Media converters can be enabled by data interface protocols utilizing RS232, RS485, or Modbus transmission control protocol (TCP). Analog and digital data acquired by the WEPM sensing devices from the actual can be captured based on a reading cycle or using triggered events in the LSN from other devices. The sensing devices can be enabled to support different wireless connectivity types such as wireless HART, industry standard architecture USA), long-range wide area network (LoRaWAN), and or 5th generation wireless. The supported spectrum can be, for example, 2.4 Gigahertz (GHZ) or 5 GHZ.

In some implementations, an LSN interface can use a serial communication module providing a protocol master for initiating requests to multiple end points. Serial communication can be implemented using a fiber optic driver that can be used to extend reachability. Access traffic from the LSN can be aggregated to the WASN by logically mapping each LSN to a WEPM centering database.

In some implementations, the WEPM can be interconnected with process end devices' local area sensing network (LASN) using the WEPM and using Internet protocol (IP) over fiber (IPFC), multiprotocol label switching (MPLS), and or asynchronous transport mode (ATM) technology as a backbone for enterprise applications. The WEPM can be interconnected with the plant facility by WASN with industrial Ethernet using dedicated fiber with a self-healing topology (ring or redundant equipment). The WEPM can introduce the use of a synchronous digital hierarchy (SDH) dedicated bandwidth based on a self-healing ring architecture as an alternate. The interconnection can be based on using dedicated point-to-point digital circuits with modems at both ends of the circuit or a wireless link. The circuit can provide connections between the local sensing device and the WAN.

The LSN can be equipped to interface to satellite communications and very small aperture terminal (VSAT) networks enabling connectivity choices for remote telemetry. The network model can have the potential to provide broadband two-way access or complete private networking options for use as a primary or emergency backup network for telemetry WEPM operations and other WEPM support services.

In some implementations, the WEPM can employs an industrial protocol link interfacing with each pond facility to send data back to the plant for monitoring and management purposes. A fiber optic or long-haul wireless link can be established within the plant fence to avoid the risk of physical tapping, tampering, and eavesdropping. However, the link can be present with multiple jurisdictions on a single link running an insecure protocol. The presence with multiple jurisdictions can be rectified through the deployment of an industrial-type firewall to regulate and control traffic flow. This can provide plants with connection management permitting only authorized protocols with application-specific controls.

In some implementations, a pond's monitoring system can be connected to the existing plant control systems through an industrial protocol link. The purpose of this link is to send readouts from the pond sensory equipment to a central plant facility for consolidating and monitoring communications. In this scenario, the plant control system can serve as a master, and the pond's sensory can serve as the slave. Industrial protocol implementation at the plant side can be industrial protocol running over (for example, serial RS-232 RS-485/digital, fiber, or wireless) while on pond's is industrial protocol, such as Transmission Control Protocol/Internet Protocol (TCP/IP) or Ethernet. The serial link can be extended between the two plants using a redundant pair of fiber optic cables.

In some implementations, the WEPM network design can include dedicated bandwidth using a self-healing ring architecture supported by dedicated fiber optic strands to provide network connectivity. This can be achieved by either an SDH transport network or an industrial Ethernet network over a dark fiber. The network topology can be a true ring that is routed to all the different remote sites if the number of sites is economically justifiable. Also, the ring can be a linear system (for example, a folded ring) for a number of sites that are limited, such as if the economic justification does not ascertain a positive outcome for a true ring.

The network design can consider the proper physical and logical separation between process automation and enterprise traffic. This can be in the form of adopting a firewall to filter traffic flow between the two domains. Networking the WEPM plant to the control center can consider logical bandwidth allocation and separation by utilizing the virtual local area network (VLAN) concept. Ample bandwidth can be allocated for real-time control applications.

The WEPM end-to-end system can be orchestrated using network synchronizations. The network synchronizations can be based on a global positioning system (GPS) coupled with a network timing protocol (NTP) server within a plant to provide precise time stamping for systems and network infrastructure. To minimize cost, an existing plant's GPS/NTP servers can be extended to the different layers. Additional GPS/NTP components can be inserted to adjust time synchronization deviations.

In some implementations, cyber security protection in the WPEM can include two domains. The first domain is the at-plant which includes the connection to the field devices and the WPEM LSN and systems. The second domain is the enterprise domain that covers the enterprise data storage, business intelligence applications, optimization tools, and end users' clients. The cyber security controls applied in each domain can together provide the desired cyber security protection level. The cyber security protection levels and types can be driven by the information assurance (IA) model for each domain. The IA model can focus on information certification and managing information risks for different network and systems domains. The IA model for enterprise can be different from the plant's domain. The IA model can focus on confidentiality, integrity, and availability. Confidentiality can correspond to managing who has access to information. Integrity can correspond to an emphasis on trustworthiness and authenticity of the information and sources of information. This includes protection against unauthorized addition, modification, and destruction of information in the system or during transient data exchange. Additionally, availability places a great importance on the timely and reliable availability of data from/to data sources.

In some implementations, WEPM data exchange implies the use of the best that sensing, computing, and control technologies provides in support of a certain process. The industrial protocol link between plant and pond transmits data for monitoring purposes only. The values aren't used in control systems or shutdown logics, and therefore there is no projected operational impact in case of a communication failure between the two systems.

In some implementations, the WEPM can introduce a data acquisition application for critical instruments. The data acquisition application can be supported by a server design that has a resiliency to a single hardware, interface, or power failure. The redundancy can be achieved by redundant servers or selecting servers that have built-in self-healing capabilities. The virtual server environments may be considered based on number of application and CPU allocation requirements.

In some implementations, the WEPM provides systems and methods to establish an industrial pond environmental parameter delineation collection process using the floating apparatus. The industrial pond environmental parameter delineation collection process can include the identification of all industrial environmental instances. Each component can be assigned an estimated pond risk (associated with an environmental pollution risks) pointer based on a calculated most significant risk pointer (MSRP) process. This can be used to build a system with a dynamic database of pond environmental reading components (primary and/or supporting) that are tagged with a pond risk pointer. The pond risk pointer can be injected into a multi-factor data analytics engine (using a mathematical relationship between MSRP and a role such as primary or supporting) to derive a risk mitigation priority that can be used by risk mitigation mechanisms such as pond management and pond rescue process deployment. As a result, the most critical asset can be mitigated in order of highest priority. In some implementations, the combination of MSRP and priority indications can be used as part of safety and environmental threat containment procedures so that the most critical assets are identified and thereby isolated to control a particular environmental threat proliferation.

The present disclosure describes techniques for integrating pond management systems, including outputting process values of a pond environmental parameters as part of power plant or refinery's process to the WEPM in addition to providing intelligent decision-making actions based on risk level calculation. Some techniques can include calculating an environmental risk level and controlling a diversion mechanism based on the risk level. If the risk level is less than a predetermined value, the diversion mechanism can be controlled to mitigate the risk. If the risk level is not less than the predetermined value, the diversion mechanism valve can be controlled to power off.

In some implementations, the WEPM can include corresponding computer systems, apparatuses, and computer programs and valve isolation devices, each configured to perform the actions of the methods. A system of one or more computers can be configured to perform particular operations or actions by virtue of having software, firmware, hardware, or a combination of software, firmware, or hardware such as sensory and control instrumentation installed on the system that, in operation, causes the system to perform the actions such as isolation. One or more computer programs can be configured to perform particular operations or actions by virtue of including instructions that, when executed by data processing apparatus, cause the apparatus to perform the actions. Other implementations can each, optionally, include one or more of the following features, alone or in combination:

A first aspect, combinable with the general implementation, including dynamically configuring the proper apparatus using DRCAS and generating, on behalf of control systems, actions for improved decision making and normalization of pond operation, where the mitigation control is based on isolation valves.

A second aspect, combinable with any of the previous aspects, where the data are process variables, the method further includes: receiving, by a floating probe, a data request; transmitting, by the onboard sensory equipment and to the float, the data request; obtaining, by the float and from auxiliary sensor equipment, the requested data, where obtaining the requested data includes extracting the environmental variables from pond system; and transmitting, by the float and to the sensory instrumentations, the requested data through pond management network.

A third aspect, combinable with any of the previous aspects, further including, before transmitting by the float device and to the sensory instrumentation, the requested data through float device.

A fourth aspect, combinable with any of the previous aspects, further including obtaining the float's configuration dynamically through DRCAS apparatus.

In some implementations, the floating probe apparatus can be used between a given corporate pond safety operation center (PSPC), and an additional process can be introduced that identifies, calculates and assigns a corporate safety and environmental risk value for each pond, including generating an associated risk mitigation priority index. The collected information based on the MSRP and risk management planning (RMP) can be used by plant management and corporate PSPC for the timely identification most critical for priority mitigation and environmental threat containment procedures. In addition, the collected information can be used in a "ready-to-use" reservoir as part of pond management procedures.

Additionally, the MSRP or RMP can be passed as an SNMP to the central NMS as part of a pre-defined MIB. The workflow process can be industry specific for oil and gas control systems environmental compliance readiness and maturity assessment, and can be extended to be used for other process automation-based industries, such as substations and water utilities. The ICS can include networks and systems hardware and software such as process automation network (PAN), distributed control systems (DCS), emergency shutdown (ESD) systems, PLCs, SCADA systems, Terminal Management Systems (TMS), networked electronic sensing systems, and monitoring (such as VMS and PMS), diagnostic, and related industrial automation and control systems. PAS also include associated internal, human, network, or machine interfaces used to provide control, safety, maintenance, quality assurance, and other process operations functionalities to continuous, batch, discrete, and combined processes.

In addition to critical functions of monitoring the entire pond process both safely and efficiently, safety remains to be the other vital part of any process control system including the deposition infrastructure and components of the system, in addition to the process input values, the database and displays. The fundamental components of a typical pond control system include a control network, controllers (PLCs), and a polarity of interconnected field devices. The term pond industrial control systems (PICS) is used as convenient shorthand for what may be a collection of electronics, including a computer-based controller that is used to monitor and control the operation of one or more processes, relays, meters, and transducers. Industrial control systems (ICS) components, networks, and server(s) can be based on open standard architecture, presenting them with safety and environmental challenges. The PICS includes networks, systems hardware, and software such as PAN; DCSs; ESD; PLCs; SCADA systems; TMSs, networked electronic sensing systems and monitoring (such as VMS and PMS); and diagnostic and related industrial automation and control systems. PICS also include associated internal, human, network, or machine interfaces used to provide control, safety, maintenance, quality assurance, and other process operations functionalities to continuous, batch, discrete, and combined processes.

This present disclosure describes an apparatus and a methodology that can enable embedded pond safety and environmental risk indication and risk mitigation prioritization capabilities as part of pond management systems based on floating probe apparatus that is in communications with ICS computers, network systems and controllers (including PLCs and RTUs). The system can generate and process MSRP and RMP workflows and calculations that feed into a plant-wide pond dashboards reflecting real-time environmental risk posture and risk mitigation priority for a facility from a pond management perspective.

Therefore, the MSRP or RMP can be displayed over an HMI as an operational alarm, such as if and when a certain pre-defined tag value is met or surpassed. Additionally, the MSRP or RMP can be passed as an SNMP to the central NMS. The dashboard can reflect dynamic and real-time indicators quantifying the environmental risk level for executive management to track and act upon a particular priority. The workflow and calculation process can be programmed in a computer or machine-based device that is in communication with isolation devices and PICS, utilizing a multitude of protocols such as TCP/IP, SNMP, and industrial protocols such as Modbus, Distributed Network Protocol 3 (DNP3), and Open Platform Communications (OPC), for example.

In some implementations, pond environmental parameter delineation controls can be implemented by identifying and assigning responsibility for all information components. A complete inventory of PICS primary and supporting components can be identified and maintained in a database using asset discovery and identification protocols.

In some implementations, multiple components can be grouped if they collectively provide a given service (for example, TDS and other fluid properties), such as grouped together as one parameter. As part of this process, an asset inventory can be dated and aligned with other pond inventories, and an aggregate component inventory can summarize different categories of components.

In some implementations, collected pond information can be updated on a time frequency factor satisfactory to plant operational requirements to verify that new changes have been reflected in the inventory database. In some implementations, collected pond management information can be classified as either primary or supporting components, as determined by the classification of processed information.

In some implementations, primary components can include any element supporting a primary environmental survey of the pond, and supporting components can include elements that fall under the pond's management category, such as the pond's depth level and sludge accumulation pattern. In some implementations, supporting components can include any processing peripherals that are connected to a communication port (for example, serial or parallel) and diversion mechanism, such as isolation valves, entry valves for entering the pond, and conveying or transmitting data. Examples include level transmitters, evaporation sensors and electronic medium connected to a pond's computer or computer network for data analysis including media containing data such as pond management data.

In some implementations, an MSRP calculation engine can calculate an MSRP that is then assigned to each pond managed on the process automation network. Assignment can occur in accordance with the following formula: MSRP=$\Sigma$ (Metric Drivers×Weight), where metric drivers and weight are extracted from data inputs that are created by pond NMG. Metric drivers can include: 1) pond maintenance coverage with weight of 25%; 2) sludge management with a weight of 25%; 3) pond overflow with a weight of 25%; 4) monitoring coverage with a weight of 25%. Level determination severity can be calculated as: 1) 1%<R<29% to be "Low"; 2) 30%<R<84% to be "Medium"; and 3) 85%<R to be "High".

Figure 9:
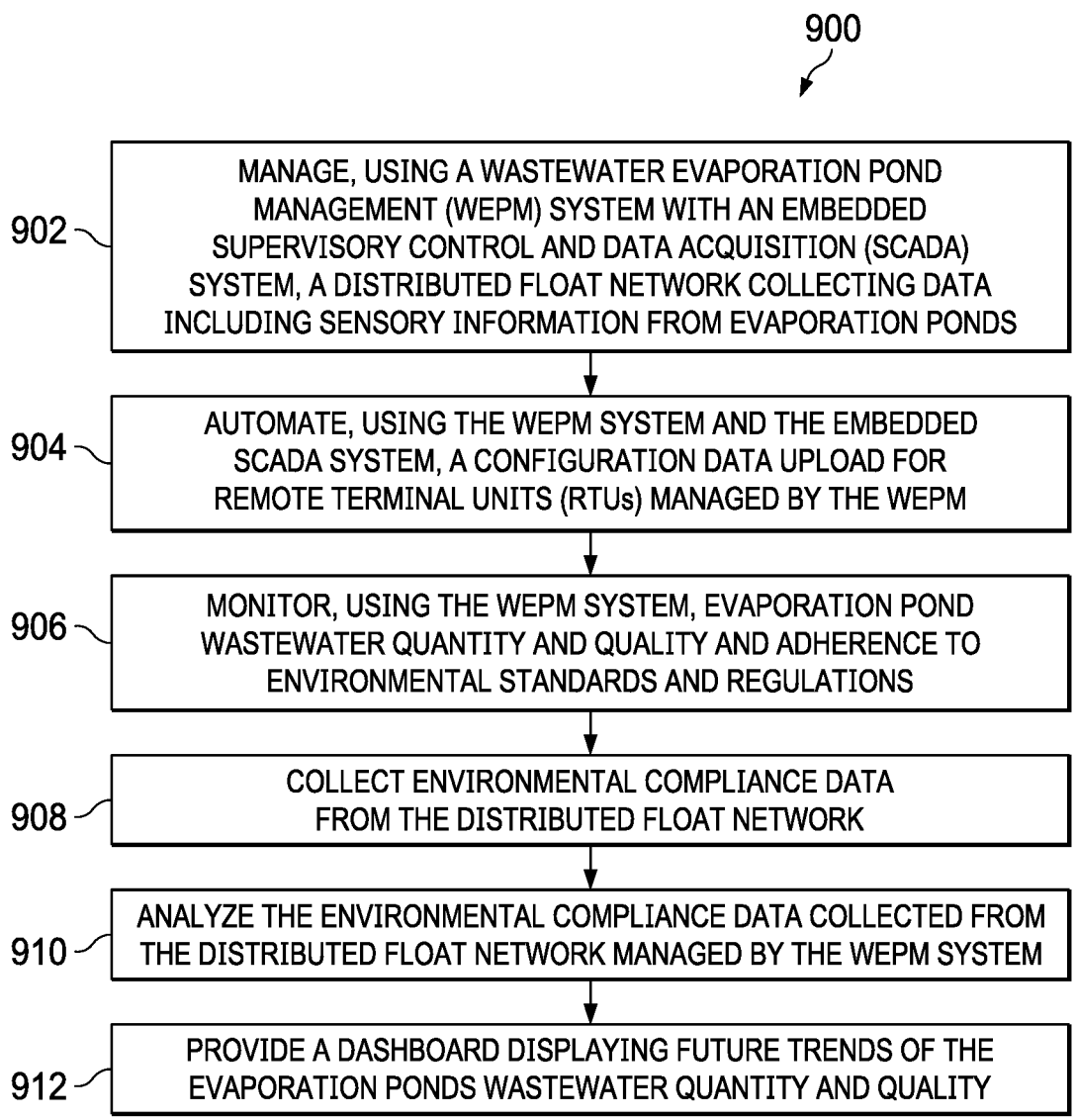
FIG. 9 is a flowchart of an example of a method for displaying future trends of the evaporation ponds wastewater quantity and quality, according to some implementations of the present disclosure.

FIG. 9 is a flowchart of an example of a method 900 for displaying future trends of the evaporation ponds wastewater quantity and quality, according to some implementations of the present disclosure. For clarity of presentation, the description that follows generally describes method 900 in the context of the other figures in this description. However, it will be understood that method 900 can be performed, for example, by any suitable system, environment, software, and hardware, or a combination of systems, environments, software, and hardware, as appropriate. In some implementations, various steps of method 900 can be run in parallel, in combination, in loops, or in any order.

The method 900 can be performed by an overall system that includes one or more processors; an embedded SCADA) system enabling automated configuration assignments of RTUs at an RTU level; a WEPM system using the SCADA system to manage a distributed float network collecting data, including sensory information, from evaporation ponds; and a non-transitory computer-readable storage medium coupled to the one or more processors and storing programming instructions for execution by the one or more processors. The programming instructions instruct the one or more processors to perform operations. The operations include: automating, using the SCADA system for upstream, a configuration data upload for the RTUs; monitoring, using the WEPM system, evaporation ponds wastewater quantity and quality and adherence to environmental standards and regulations; collecting environmental compliance data from the distributed float network; analyzing the environmental compliance data collected from the distributed float network managed by the WEPM system; and providing a dashboard displaying future trends of the evaporation ponds wastewater quantity and quality. The distributed float network can include, for each floating probe, an overflow indicator, an effluent-in indicator, an effluent-out indicator, a total suspended solids indicator, a temperature indicator, and a turbidity indicator. Pond fixed sensory array components can also include sludge accumulation patterns and pond structural analysis data.

At 902, a distributed float network is managed using the WEPM system with an embedded supervisory control and data acquisition SCADA system. The WEPM collects data, including sensory information, from evaporation ponds. From 902, method 900 proceeds to 904.

At 904, a configuration data upload for remote terminal units (RTUs) managed by the WEPM is automated using the WEPM system and the embedded SCADA system. From 904, method 900 proceeds to 906.

At 906, evaporation pond wastewater quantity and quality and adherence to environmental standards and regulations are monitored using the WEPM system. From 906, method 900 proceeds to 908.

At 908, environmental compliance data is collected from the distributed float network. The system can include a dynamic RTU configurator assignment server (DRCAS) capability extended to distributed float apparatus. From 908, method 900 proceeds to 910.

At 910, the environmental compliance data collected from the distributed float network managed by the WEPM system is analyzed. From 910, method 900 proceeds to 912.

At 912, a dashboard is provided displaying future trends of the evaporation ponds wastewater quantity and quality. After 912, method 900 can stop.

In some implementations, method 900 further includes communicating, by the WEPM system and the SCADA system, with oil and gas applications, pipeline applications, power and utility applications. In some implementations, method 900 further includes generating, on behalf of control systems, actions for improved decision making and normalization of pond operation and maintenance, where the actions include mitigation control using isolation valves.

In some implementations, method 900 further includes: receiving, by a floating probe of the distributed float network, a data request; transmitting, by onboard sensory equipment to the distributed float network, the data request; obtaining, by the distributed float network and from auxiliary sensor equipment, the requested data, including obtaining environmental variables from floating probes of the evaporation ponds; and transmitting, by the distributed float network and to the auxiliary sensor equipment, the requested data through pond management network. In some implementations, method 900 further includes obtaining a configuration of each floating probe dynamically through DRCAS apparatus.

Figure 10:
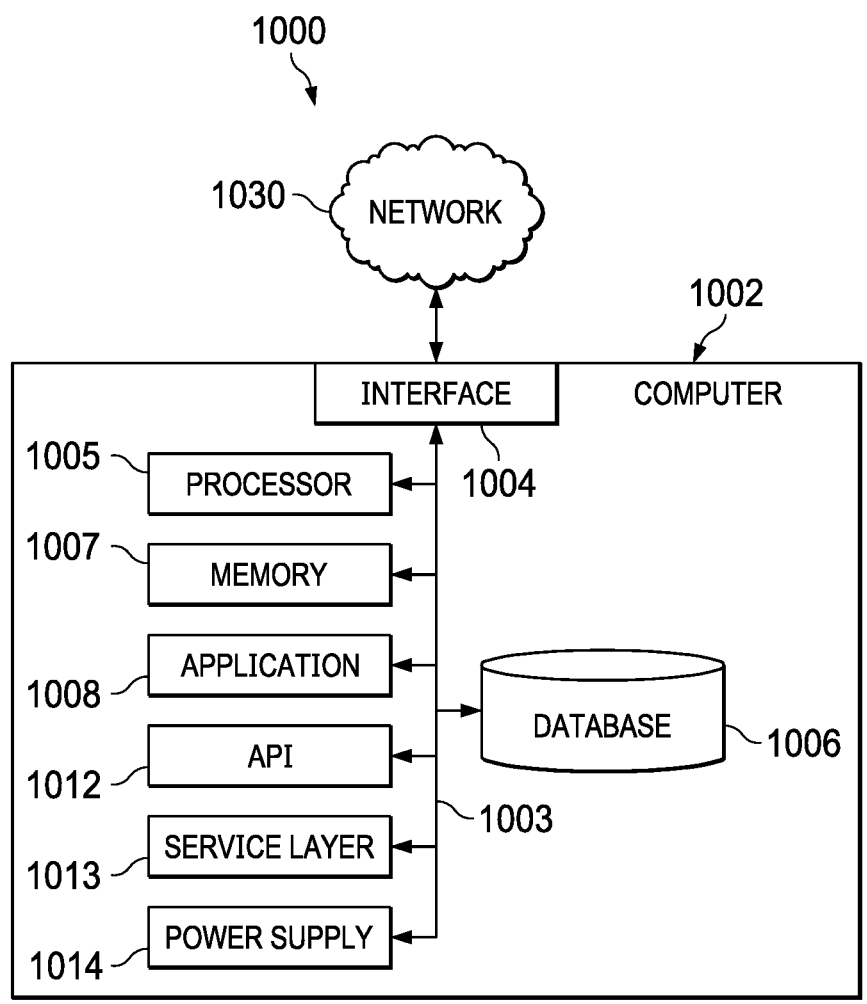
FIG. 10 is a block diagram illustrating an example computer system used to provide computational functionalities associated with described algorithms, methods, functions, processes, flows, and procedures as described in the present disclosure, according to some implementations of the present disclosure.

FIG. 10 is a block diagram of an example computer system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a top level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both) over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Described implementations of the subject matter can include one or more features, alone or in combination.

For example, in a first implementation, a computer-implemented method includes the following. A distributed float network is managed using a wastewater evaporation pond management (WEPM) system with an embedded supervisory control and data acquisition (SCADA) system. The WEPM collects data, including sensory information, from evaporation ponds. A configuration data upload for remote terminal units (RTUs) managed by the WEPM is automated using the WEPM system and the embedded SCADA system. Evaporation pond wastewater quantity and quality and adherence to environmental standards and regulations are monitored using the WEPM system. Environmental compliance data is collected from the distributed float network. The environmental compliance data collected from the distributed float network managed by the WEPM system is analyzed. A dashboard is provided displaying future trends of the evaporation ponds wastewater quantity and quality.

The foregoing and other described implementations can each, optionally, include one or more of the following features:

A first feature, combinable with any of the following features, the method further including communicating, by the WEPM system and the SCADA system, with oil and gas applications, pipeline applications, and power and utility applications.

A second feature, combinable with any of the previous or following features, the method further including generating, on behalf of control systems, actions for improved decision making and normalization of pond operation and maintenance, where the actions include mitigation control using isolation valves.

A third feature, combinable with any of the previous or following features, where automating the configuration data upload for the RTUs includes using a dynamic RTU configurator assignment server (DRCAS) capability extended to the distributed float apparatus.

A fourth feature, combinable with any of the previous or following features, the method further including: receiving, by a floating probe of the distributed float network, a data request; transmitting, by onboard sensory equipment to the distributed float network, the data request; obtaining, by the distributed float network and from auxiliary sensor equipment, the requested data, including obtaining environmental variables from floating probes of the evaporation ponds; and transmitting, by the distributed float network and to the auxiliary sensor equipment, the requested data through pond management network.

A fifth feature, combinable with any of the previous or following features, the method further including obtaining a configuration of each floating probe dynamically through the DRCAS apparatus.

A sixth feature, combinable with any of the previous or following features, where the distributed float network includes, for each floating probe, an overflow indicator, an effluent-in indicator, an effluent-out indicator, a total suspended solids indicator, a temperature indicator, and a turbidity indicator.

In a second implementation, a non-transitory, computer-readable medium stores one or more instructions executable by a computer system to perform operations including the following. A distributed float network is managed using a wastewater evaporation pond management (WEPM) system with an embedded supervisory control and data acquisition (SCADA) system. The WEPM collects data, including sensory information, from evaporation ponds. A configuration data upload for remote terminal units (RTUs) managed by the WEPM is automated using the WEPM system and the embedded SCADA system. Evaporation pond wastewater quantity and quality and adherence to environmental standards and regulations are monitored using the WEPM system. Environmental compliance data is collected from the distributed float network. The environmental compliance data collected from the distributed float network managed by the WEPM system is analyzed. A dashboard is provided displaying future trends of the evaporation ponds wastewater quantity and quality.

The foregoing and other described implementations can each, optionally, include one or more of the following features:

A first feature, the operations further including communicating, by the WEPM system and the SCADA system, with oil and gas applications, pipeline applications, and power and utility applications.

A second feature, combinable with any of the previous or following features, the operations further including generating, on behalf of control systems, actions for improved decision making and normalization of pond operation and maintenance, where the actions include mitigation control using isolation valves.

A third feature, combinable with any of the previous or following features, where automating the configuration data upload for the RTUs includes using a dynamic RTU configurator assignment server (DRCAS) capability extended to the distributed float apparatus.

A fourth feature, combinable with any of the previous or following features, the operations further including: receiving, by a floating probe of the distributed float network, a data request; transmitting, by onboard sensory equipment to the distributed float network, the data request; obtaining, by the distributed float network and from auxiliary sensor equipment, the requested data, including obtaining environmental variables from floating probes of the evaporation ponds; and transmitting, by the distributed float network and to the auxiliary sensor equipment, the requested data through pond management network.

A fifth feature, combinable with any of the previous or following features, the operations further including obtaining a configuration of each floating probe dynamically through the DRCAS apparatus.

In a third implementation, a computer-implemented system includes: one or more processors; an embedded supervisory control and data acquisition (SCADA) system enabling automated configuration assignments of remote terminal units (RTUs) at an RTU level; a wastewater evaporation pond management (WEPM) system using the SCADA system to manage a distributed float network collecting data, including sensory information, from evaporation ponds; and a non-transitory computer-readable storage medium coupled to the one or more processors and storing programming instructions for execution by the one or more processors, the programming instructions instructing the one or more processors to perform operations including the following. A distributed float network is managed using a wastewater evaporation pond management (WEPM) system with an embedded supervisory control and data acquisition (SCADA) system. The WEPM collects data, including sensory information, from evaporation ponds. A configuration data upload for remote terminal units (RTUs) managed by the WEPM is automated using the WEPM system and the embedded SCADA system. Evaporation pond wastewater quantity and quality and adherence to environmental standards and regulations are monitored using the WEPM system. Environmental compliance data is collected from the distributed float network. The environmental compliance data collected from the distributed float network managed by the WEPM system is analyzed. A dashboard is provided displaying future trends of the evaporation ponds wastewater quantity and quality.

The foregoing and other described implementations can each, optionally, include one or more of the following features:

A first feature, the operations further including communicating, by the WEPM system and the SCADA system, with oil and gas applications, pipeline applications, and power and utility applications.

A second feature, combinable with any of the previous or following features, the operations further including generating, on behalf of control systems, actions for improved decision making and normalization of pond operation and maintenance, where the actions include mitigation control using isolation valves.

A third feature, combinable with any of the previous or following features, further including a dynamic RTU configurator assignment server (DRCAS) capability extended to the distributed float apparatus.

A fourth feature, combinable with any of the previous or following features, the operations further including: receiving, by a floating probe of the distributed float network, a data request; transmitting, by onboard sensory equipment to the distributed float network, the data request; obtaining, by the distributed float network and from auxiliary sensor equipment, the requested data, including obtaining environmental variables from floating probes of the evaporation ponds; and transmitting, by the distributed float network and to the auxiliary sensor equipment, the requested data through pond management network.

A fifth feature, combinable with any of the previous or following features, the operations further including obtaining a configuration of each floating probe dynamically through the DRCAS apparatus.

A fifth feature, combinable with any of the previous or following features, where the distributed float network includes, for each floating probe, an overflow indicator, an effluent-in indicator, an effluent-out indicator, a total suspended solids indicator, a temperature indicator, a turbidity indicator, sludge accumulation patterns, and pond structural analysis data.

A sixth feature, combinable with any of the previous or following features, where the distributed float network includes, for each floating probe, scanning capabilities (for example, based on ultrasonic, infra-red, or laser) to provide pond structural analysis for potential cracks or deformations and sludge accumulation patterns. The sludge accumulation patterns and thickness information may be used among others to determine the variable pond fluid holding capacity and the need for potential scraping activities to normalize pond holding capacity within specifications.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented system, comprising:
   one or more processors;
   an embedded supervisory control and data acquisition (SCADA) system enabling automated configuration assignments of remote terminal units (RTUs) at an RTU level;
   a wastewater evaporation pond management (WEPM) system using the SCADA system to manage a distributed float network collecting data, including sensory information, from evaporation ponds;
   a dynamic RTU configurator assignment server (DRCAS) capability extended to the distributed float apparatus; and
   a non-transitory computer-readable storage medium coupled to the one or more processors and storing programming instructions for execution by the one or more processors, the programming instructions instructing the one or more processors to perform operations comprising:
      automating, using the SCADA system for upstream, a configuration data upload for the RTUs;
      monitoring, using the WEPM system, evaporation ponds wastewater quantity and quality and adherence to environmental standards and regulations;
      collecting environmental compliance data from the distributed float network;
      analyzing the environmental compliance data collected from the distributed float network managed by the WEPM system; and
      providing a dashboard displaying future trends of the evaporation ponds wastewater quantity and quality.

2. The computer-implemented system of claim 1, the operations further comprising communicating, by the WEPM system and the SCADA system, with oil and gas applications, pipeline applications, and power and utility applications.

3. The computer-implemented system of claim 1, the operations further comprising generating, on behalf of control systems, actions for improved decision making and normalization of pond operation and maintenance, wherein the actions include mitigation control using isolation valves.

4. The computer-implemented system of claim 1, the operations further comprising:
   receiving, by a floating probe of the distributed float network, a data request;
   transmitting, by onboard sensory equipment to the distributed float network, the data request;
   obtaining, by the distributed float network and from auxiliary sensor equipment, the requested data, including obtaining environmental variables from floating probes of the evaporation ponds; and
   transmitting, by the distributed float network and to the auxiliary sensor equipment, the requested data through pond management network.

5. The computer-implemented system of claim 1, the operations further comprising obtaining a configuration of each floating probe dynamically through the DRCAS capability.

6. The computer-implemented system of claim 1, wherein the distributed float network includes, for each floating probe, an overflow indicator, an effluent-in indicator, an effluent-out indicator, a total suspended solids indicator, a temperature indicator, a turbidity indicator, sludge accumulation patterns, and pond structural analysis data.

7. A computer-implemented method, comprising:
   managing, using a wastewater evaporation pond management (WEPM) system with an embedded supervisory control and data acquisition (SCADA) system, a distributed float network collecting data, including sensory information, from evaporation ponds;
   automating, using the WEPM system and the embedded SCADA system, a configuration data upload for remote terminal units (RTUs) managed by the WEPM, wherein automating the configuration data upload for the RTUs includes using a dynamic RTU configurator assignment server (DRCAS) capability extended to the distributed float apparatus;
   monitoring, using the WEPM system, evaporation pond wastewater quantity and quality and adherence to environmental standards and regulations;
   collecting environmental compliance data from the distributed float network;
   analyzing the environmental compliance data collected from the distributed float network managed by the WEPM system; and
   providing a dashboard displaying future trends of the evaporation ponds wastewater quantity and quality.

8. The computer-implemented method of claim 7, further comprising communicating, by the WEPM system and the SCADA system, with oil and gas applications, pipeline applications, and power and utility applications.

9. The computer-implemented method of claim 7, further comprising generating, on behalf of control systems, actions for improved decision making and normalization of pond operation and maintenance, wherein the actions include mitigation control using isolation valves.

10. The computer-implemented method of claim 7, further comprising:

receiving, by a floating probe of the distributed float network, a data request;
transmitting, by onboard sensory equipment to the distributed float network, the data request;
obtaining, by the distributed float network and from auxiliary sensor equipment, the requested data, including obtaining environmental variables from floating probes of the evaporation ponds; and
transmitting, by the distributed float network and to the auxiliary sensor equipment, the requested data through pond management network.

11. The computer-implemented method of claim 7, further comprising obtaining a configuration of each floating probe dynamically through the DRCAS capability.

12. The computer-implemented method of claim 7, wherein the distributed float network includes, for each floating probe, an overflow indicator, an effluent-in indicator, an effluent-out indicator, a total suspended solids indicator, a temperature indicator, a turbidity indicator, sludge accumulation patterns, and pond structural analysis data.

13. A non-transitory, computer-readable medium storing one or more instructions executable by a computer system to perform operations comprising:
managing, using a wastewater evaporation pond management (WEPM) system with an embedded supervisory control and data acquisition (SCADA) system, a distributed float network collecting data, including sensory information, from evaporation ponds;
automating, using the WEPM system and the embedded SCADA system, a configuration data upload for remote terminal units (RTUs) managed by the WEPM, wherein automating the configuration data upload for the RTUs includes using a dynamic RTU configurator assignment server (DRCAS) capability extended to the distributed float apparatus;
monitoring, using the WEPM system, evaporation pond wastewater quantity and quality and adherence to environmental standards and regulations;
collecting environmental compliance data from the distributed float network;
analyzing the environmental compliance data collected from the distributed float network managed by the WEPM system; and
providing a dashboard displaying future trends of the evaporation ponds wastewater quantity and quality.

14. The non-transitory, computer-readable medium of claim 13, the operations further comprising communicating, by the WEPM system and the SCADA system, with oil and gas applications, pipeline applications, and power and utility applications.

15. The non-transitory, computer-readable medium of claim 13, the operations further comprising generating, on behalf of control systems, actions for improved decision making and normalization of pond operation and maintenance, wherein the actions include mitigation control using isolation valves.

16. The non-transitory, computer-readable medium of claim 13, the operations further comprising:
receiving, by a floating probe of the distributed float network, a data request;
transmitting, by onboard sensory equipment to the distributed float network, the data request;
obtaining, by the distributed float network and from auxiliary sensor equipment, the requested data, including obtaining environmental variables from floating probes of the evaporation ponds; and
transmitting, by the distributed float network and to the auxiliary sensor equipment, the requested data through pond management network.

17. The non-transitory, computer-readable medium of claim 13, the operations further comprising obtaining a configuration of each floating probe dynamically through the DRCAS capability.

* * * * *